Figure 1:
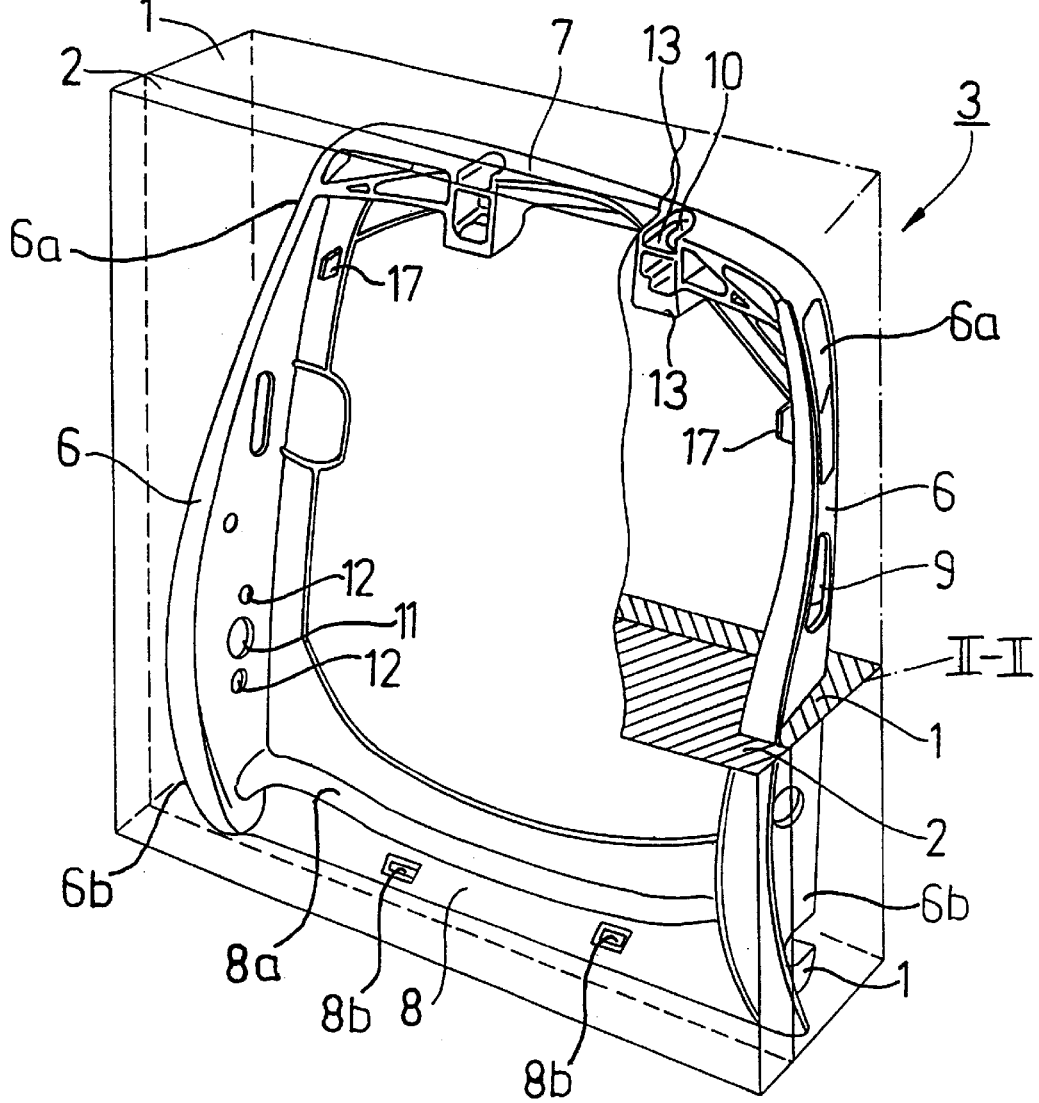

United States Patent [19]
Bartelt et al.

[11] Patent Number: 5,897,168
[45] Date of Patent: Apr. 27, 1999

[54] VEHICLE SEAT FRAME

[75] Inventors: Regina Bartelt, Buisburg; Martin Strenger, Bochum; Hubert Wissdorf, Rommerskirchen; Martin Zynda, Remsheid; Thomas Domehl, Bolanden, all of Germany

[73] Assignee: Johnson Controls Technology Company, Plymouth, Mich.

[21] Appl. No.: 08/981,858

[22] PCT Filed: Jul. 26, 1996

[86] PCT No.: PCT/US96/12349

§ 371 Date: Apr. 20, 1998

§ 102(e) Date: Apr. 20, 1998

[87] PCT Pub. No.: WO97/04689

PCT Pub. Date: Feb. 13, 1997

[30]    Foreign Application Priority Data

Jul. 28, 1995  [DE]  Germany .................... 19527470

[51] Int. Cl.⁶ ........................................ A47C 7/40

[52] U.S. Cl. ........................... 297/452.18; 29/897.2
[58] Field of Search .................... 297/216.1, 216.13, 297/452.1, 452.18; 29/527.5, 897.2

[56]         References Cited

U.S. PATENT DOCUMENTS

| 4,544,204 | 10/1985 | Schmale ........................ 297/452.18 |
| 4,585,273 | 4/1986 | Higgs et al. . |
| 4,624,503 | 11/1986 | Kazunori . |
| 4,695,097 | 9/1987 | Muraishi ........................ 297/452.18 |
| 5,567,017 | 10/1996 | Bourgeois et al. ............ 297/452.18 X |
| 5,636,901 | 6/1997 | Grilliot et al. ................... 297/452.18 |

*Primary Examiner*—Peter R. Brown
*Attorney, Agent, or Firm*—Harness, Dickey & Pierce, P.L.C.

[57]            ABSTRACT

A frame of a backrest or a seat made of metal for a motor vehicle seat can be produced from magnesium in a single operation. The frame employs a design which uses a Z-shaped profile as its basic geometry and is produced as a magnesium die casting.

12 Claims, 1 Drawing Sheet

VEHICLE SEAT FRAME

BACKGROUND OF THE INVENTION

1. Field of the Invention

The invention concerns a frame of a back-rest or seat made of metal for the seat of a motor vehicle. It further concerns a process for the manufacture of the frame.

2. Description of the Prior Art

In the manufacture of automobiles magnesium alloys are used because of their low specific gravity and their strength. Among the alloys, which consist essentially of magnesium, the so-called "electron metals" (or "Dow metals") may be worth considering; these are alloys consisting of 90% or more magnesium with—depending on the application additions of, for example, aluminum, zinc, manganese, copper or silicon, which are, in contrast to aluminum, insensitive to alkaline solutions, and which make weight savings of 80% as compared to iron possible, and even in comparison with aluminum alloys, such as Duralumin, weight savings of 20 to 40% are possible. By means of pickling them in a nitric acid containing alkaline dichromate bath, the electron metals can be given a coating, which protects them against being attacked by the atmosphere. Alloys of 98% magnesium and 2% manganese are practically permanently resistant to water.

In particular, the magnesium alloys with a high proportion of magnesium seem, therefore, to be predestined for the manufacture of vehicles, if weight savings combined with high mechanical strength are being desired. A problem in the application of magnesium for the production of the complicated support structures or frames of motor vehicle seats consists in the fact that magnesium cannot be spot welded. Therefore, if need be, only screws or rivets can be basically considered for the purpose of joining magnesium. The complicated core-containing dies, which are known from the support structure designs used for designing with steel, not only increase the cost of the dies, but generally also require substantial subsequent machining. Because in contrast to iron or steel profiles, cast magnesium profiles cannot be bent, the C-profiles typical for steel cannot be produced without complicated die work and efforts for removing parts from the dies, as well as with subsequent machining. But because the mechanical strength or the material hardness of magnesium and the alloys with a high proportion of magnesium is below that of steel, it is necessary in the case of the otherwise desirable substitution of magnesium for steel, to compensate for the reduced strength of the material, among other things, by the choice of the shape of the magnesium profile.

The invention is based on the problem of generating a magnesium profile for the support structure of a motor vehicle seat or the back rest pertaining to it, which can be die cast in one work process in such a way that not only the cost of the die used, but also the cost of removal from the die and of any possible subsequent machining are to be minimal.

The solution in accordance with the invention consists for support structure of the initially referred to type is that it be made according to a design—i.e. a structural assembly—which has a Z-profile as its basic geometry and consists of a magnesium die casting. According to a further aspect of the invention, the design is laid out for a magnesium die casting tool functioning in accordance with the "waffle iron principle". In a process according to the invention for the manufacture of a support structure, it is die cast in a single operation in a die according to the waffle iron principle, in which process preferably a die without a core is used.

Improvements and further embodiments will be shown in the subordinate claims.

By virtue of the invention it is being achieved that the magnesium die cast part produced can be easily, that is to say by simply pulling an upper and a lower die apart, removed from the die. Subsequent machining is generally only needed at special locations, such as the areas for injecting material. Without any difficulty, a design is feasible which permits the dissipation of energy by deformation. According to the invention, the design space can be utilized in a similarly favorable fashion as in the case of conventional steel designs. In the regions of the structure, which are subjected to lower stresses, there is no problem in making the wall thickness thinner than in the case of the regions, which are subjected to higher stresses. Tapering for the removal from the dies is generally not required for the Z-profile.

In accordance with the invention, a Z-profile is contemplated as the basic geometric shape. This profile can be produced in a simple or an extended form. The concept of a "Z-profile", within the scope of the invention, includes also a modified Z-profile, to which, so to speak, an additional Z (or L) is added at the lower or upper horizontal line of the Z. By doing this, the ease of removal from the die, that is to say, the removal from the die by means of pulling the upper and the lower die apart, is preserved. However, additional lateral slides can be provided in the forming tool, which make it possible to generate complicated forms, flat surfaces without a taper or a lead angle for removal from the die (for the purpose of joining mechanical elements), and also the necessary reinforcement by means of ribs, which is required in many areas. In individual cases or in individual areas of the support structure, the Z-profile—which merely represents the basic geometry—can also be simplified into an L-profile.

Within the framework of the invention, the magnesium die casting can consist of pure magnesium, but also of a magnesium alloy. Preferred are alloys which consist mainly of magnesium, especially those with 90% or more magnesium, which are resistant against being attacked by the atmosphere, against water, acids, alkaline solutions, oils and fats, that is to say against the substances, with which the support structure in a motor vehicle or in the repair shop may come into contact.

The support structure of a seat frame produced in accordance with the invention can be equipped with ribs, which are to be determined in a known manner by means of strength calculations. Receptacles for a lateral cover of the seat as well as for a balancing spring in a possibly contemplated height adjustment device of the seat can be preferably integrated into the base of the seat (the front edge of the seat). The structure or the profile can be produced without difficulty in such a manner, that the connecting members for the addition of springs below the seat are to be provided without the use of additional slides in the die casting form. Furthermore, the upholstery hooks as well as a cover for the mechanical adjustment elements of the height adjustment device of the seat can be integrated into the lateral parts of the seat of the support structure. Furthermore, the contours and the wall thickness of the rear tie-bar of the support structure can be optimized in such a manner that especially in the case of the option without height adjustment, any additional tie-rod for both of the side parts of the seats becomes unnecessary. Finally, the connection of the seat frame to the seat rails, which are provided on the floor panels of the motor vehicle—for example in order to save weight, and particularly for an option without height adjustment—can be limited to three points each.

Also, the support structure of a back-rest frame to be made, according to the invention, from a magnesium die casting is constructed for reasons of strength, as far as its basic geometry is concerned, from a Z-profile with the corresponding use of ribs for the side pieces. In this context, the upholstery as well as the connecting members of the draw spring of a wire mat, which forms the basis for the upholstery, can be integrated into the side pieces of the back-rest. The contouring of the upper tie-rod as well as of its connection with the side pieces of the back-rest of the seat can, like all the remaining contouring of the entire support structure, be determined by strength calculations and designed on the basis of a simple or an expanded Z-profile.

The back-rest frames in accordance with the invention can also be equipped with recesses for a head rest; these should preferably consist of lateral struts, which are placed one above the other, and the positioning, contouring and wall thickness of which should also be optimized by calculations in accordance with the desired values of strength. The design can be fashioned according to further aspects of the invention in such a manner that the casting of the recesses does not require any additional slides in the die casting form. In order to attach a head rest, a design can be chosen, which not only allows an easy removal from the die, but also, after the installation of a bushing, for example a plastic enclosure, the use of existing head rests. In the frame of the back-rest, recesses for an adjustment device of the back-rest of the seat are to be provided, preferably by means of a massive magnesium casting sprue. In doing this, the massive magnesium casting sprue together with the optimized recesses in the rest of the design should generate a stable and yet light-weight unit. Finally, a cover for a transfer rod as well as the upholstery hooks can be integrated into the lower tie-rod at the frame of the back-rest of the seat.

Figure 2:
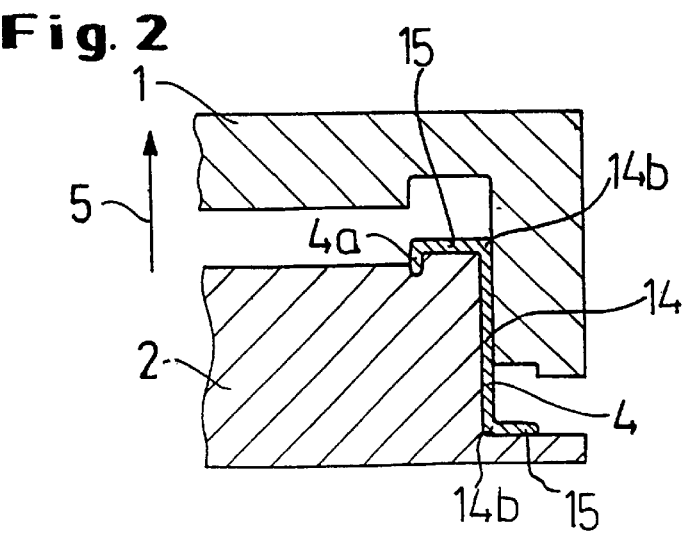

Details of the invention will be explained on the basis of a schematic drawing of an example of an embodiment of the invention. The following is shown:

FIG. 1 is a schematic presentation of a forming tool (for the back-rest of the seat) for the magnesium die casting, which consists partly of an exploded view; and FIG. 2 is a section along the line II—II of FIG. 1.

In the magnesium die casting tool, which consists of an upper die 1 and a lower die 2 according to FIG. 1, the vehicle seat frame which, as a whole, is given the designation 3, is shown as the example of an embodiment of the invention.

From FIG. 2 it can be seen that the vehicle seat frame has a Z-profile or cross section 4 as its basic geometry with an L-shaped bend 4a at the top, which has the purpose of stiffening it. The Z-profile has a center web 14 with side edges 14b. Flanges 15 extend from the side edges of the center web 14 in opposite directions from one another. The flanges extend from the center web at an angle of ninety degrees or more. This facilitates removal of the frame from the die casting tool. A lip 4a can extend from the distal edge of one or both of the flanges 15. This Z-profile 4 is produced by means of a magnesium die casting process in a die casting form. The cast Z-profile 4 can be removed from the die in the simplest possible manner, namely by separation of the upper die 1 and the lower die 2 in the direction of separation 5 shown. An equally simple removal from the die is possible if a Z-profile is provided which is further modified in the manner defined above.

The vehicle seat back-rest frame shown in FIG. 1 consists of spaced side pieces 6, having upper ends 6a and lower ends 6b, an upper tie-rod 7 connected to the upper ends of the side pieces and a lower tie-rod 8 connected to the lower end of the side pieces forming a generally rectangular or trapezoidal cast body. In an alternative form, the lower tie-rod 8 may be omitted forming a three sided frame. The side pieces can be equipped with an aperture 9 for a side airbag and/or with an aperture 11 or apertures 11 and 12 for the unlocking of the tilt mechanism in the case of two-door vehicles. Recesses 10 for a head rest can be integrated into the upper tie-rod 7. The recess 10 may consist, according to the drawing, of cross struts 13, which are placed one above the other, and the attachment, contouring and wall thickness of which are to be optimized for the desired values of strength in such a manner that the production of the recess does not require any additional slides during the die casting process.

The lower tie-rod 8 has a cover 8a integrated therein for a transfer rod of a seat adjustment mechanism to extend across the seat frame. The lower tie-rod is further formed with upholstery hooks 8b which are used to attach the seat upholstery to the frame. Magnesium casting sprues 18 are located at the side pieces 6 or lower tie-rod 8. These can be used as a receptacle for a back rest adjustment device due to the increased strength provided by the extra material of the sprue. The side pieces 6 are integrally formed with upholstery hooks or support brackets 17 which can be used to mount the seat upholstery, an upholstery strap, or the draw spring of a wire mat.

A frame in accordance with the invention for a seat for a motor vehicle can be manufactured from magnesium in a single operation, if it consists of a design, which has the Z-profile as its basic geometry, and if it is produced by the magnesium die casting process.

We claim:

1. A frame (3) for a vehicle seat assembly characterized in that it has a single piece body cast of magnesium alloy having a pair of spaced elongated side pieces (6) each having upper and lower ends (6a, 6b) and an upper tie-rod (7) connected to the upper ends of the side pieces, the side pieces having a profile (4) which is generally Z-shaped with a center web (14) having opposite side edges (14a, 14b) and flanges (15) extending from the side edges in opposite directions relative to one another and at an angle of at least ninety degrees to the center web.

2. The frame of claim 1 characterized in that the single piece cast body further comprises a lower tie-rod (8) connected to the lower ends of the side pieces.

3. The frame according to claim 2, characterized by a cover (8a) for a transfer rod which is integrated into the lower tie-rod (8) of the frame.

4. The frame according to claim 2 characterized by upholstery hooks (16) which are integrated into the lower tie-rod of the frames.

5. The frame of claim 1 characterized by a lip (4a) extending from a distal edge of one of the flanges of the Z-shaped profile of the side pieces, the lip extending generally parallel to the center web.

6. The frame of claim 1 characterized in that the side pieces include apertures (11, 12) for attaching hardware to attach the frame to a supporting structure.

7. The frame according to claim 1, characterized in that into the side pieces of the frame of the seat, upholstery hooks (17) as well as a cover for the mechanical adjustment elements for an adjustment device for the height of the seat are integrated.

8. The frame according to claim 1, characterized in that an upholstery strap as well as support brackets (17) for a draw spring of a wire mat to be installed on the frame are integrated into the side pieces (6) of the frame.

9. The frame according to claim 1, characterized in that in the upper tie-rod (7) of the frame, recesses (10) for a head rest are provided, which include at least two cross struts (13), which are located one below the other.

10. The frame according to claim 1, characterized in that a magnesium casting sprue is located at the side pieces (6) or at the lower tie-rod (8) of the frame as a receptacle for the back-rest adjustment device.

11. A process for the production of the frame according to claim 1, characterized in that the metal body is die cast in a single operation in a die without a core.

12. The process according to claim 1, characterized in that in order to achieve a multiplicity of forms, additional lateral slides are installed in the casting die.

* * * * *